US008849060B2

(12) United States Patent
Tamura et al.

(10) Patent No.: US 8,849,060 B2
(45) Date of Patent: Sep. 30, 2014

(54) IMAGE PROCESSING METHOD, IMAGE PROCESSING SYSTEM AND DISPLAY DEVICE FOR MODIFYING BACKGROUND COLORS BASED ON OBJECT COLORS

(75) Inventors: Hikaru Tamura, Zama (JP); Toshiki Hamada, Isehara (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 205 days.

(21) Appl. No.: 13/523,038

(22) Filed: Jun. 14, 2012

(65) Prior Publication Data

US 2013/0004063 A1    Jan. 3, 2013

(30) Foreign Application Priority Data

Jul. 1, 2011 (JP) .................................. 2011-147047

(51) Int. Cl.
*G06K 9/00* (2006.01)
*G06K 9/40* (2006.01)
*G09G 5/02* (2006.01)
*G06K 9/34* (2006.01)
*G06T 7/00* (2006.01)

(52) U.S. Cl.
CPC ............ *G06K 9/34* (2013.01); *H04N 2213/006* (2013.01); *G06T 2207/10024* (2013.01); *G06T 7/0081* (2013.01); *G06T 2207/20144* (2013.01)
USPC ............................. 382/274; 382/167; 345/589

(58) Field of Classification Search
CPC . G06T 5/007; G06K 9/4652; H04N 2213/006
USPC ........... 382/164, 167, 274; 345/589, 590, 617
See application file for complete search history.

(56) References Cited

U.S. PATENT DOCUMENTS 6,069,976 A * 5/2000 Kim .............................. 382/239
6,198,835 B1 * 3/2001 Banton et al. ................. 382/112
6,546,052 B1 * 4/2003 Maeda et al. ............ 375/240.08

(Continued)

FOREIGN PATENT DOCUMENTS

JP     03-186893 A     8/1991
JP     2941829         8/1999

(Continued)

OTHER PUBLICATIONS

International Search Report (Application No. PCT/JP2012/066097) Dated Sep. 25, 2012.
Written Opinion (Application No. PCT/JP2012/066097) Dated Sep. 25, 2012.

*Primary Examiner* — Yubin Hung
(74) *Attorney, Agent, or Firm* — Eric J. Robinson; Robinson Intellectual Property Law Office, P.C.

(57) ABSTRACT

An image processing method is provided, which includes a step of separating an object image into an object region and a background region, a step of calculating a gray scale value of an average color of the object region, a step of calculating a gray scale value of an inversion color of the object region by using the gray scale value of the average color, and a step of calculating a gray scale value of a background region of a processed image by using the gray scale value of the inversion color and a gray scale value of the background region of the object image.

17 Claims, 8 Drawing Sheets

(56) References Cited

U.S. PATENT DOCUMENTS

| | | | |
|---|---|---|---|
| 2006/0182363 A1* | 8/2006 | Jellus | 382/254 |
| 2008/0130744 A1* | 6/2008 | Huang et al. | 375/240.08 |
| 2008/0187202 A1* | 8/2008 | Qian et al. | 382/131 |
| 2009/0128478 A1 | 5/2009 | Dembo | |
| 2009/0136158 A1 | 5/2009 | Tamura | |
| 2009/0225183 A1* | 9/2009 | Tamura | 348/222.1 |
| 2009/0324074 A1 | 12/2009 | Dembo | |
| 2010/0201709 A1* | 8/2010 | Yang et al. | 345/629 |
| 2012/0243786 A1 | 9/2012 | Koyama et al. | |

FOREIGN PATENT DOCUMENTS

| | | |
|---|---|---|
| JP | 2005-258013 A | 9/2005 |
| JP | 2006-001952 A | 1/2006 |
| JP | 2006-186485 A | 7/2006 |
| JP | 2010-152521 A | 7/2010 |
| WO | WO2009/066590 | 5/2009 |
| WO | WO2009/066783 | 5/2009 |

\* cited by examiner

FIG. 7A1  FIG. 7A2
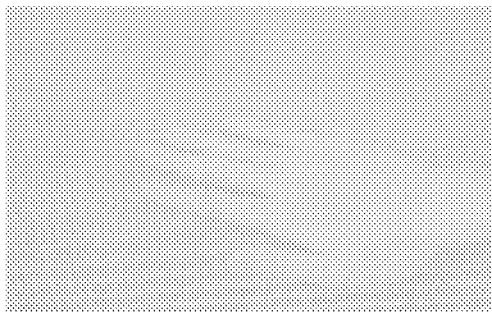 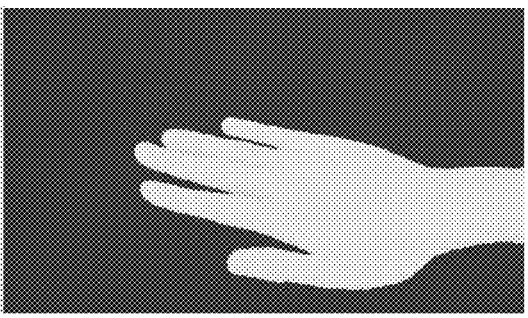
FIG. 7B1  FIG. 7B2
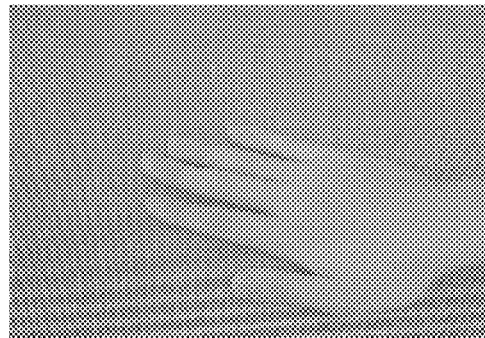 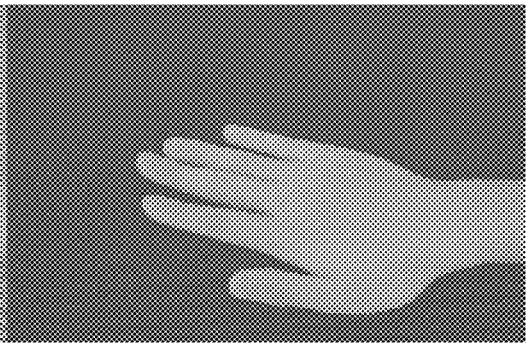
FIG. 7C1  FIG. 7C2
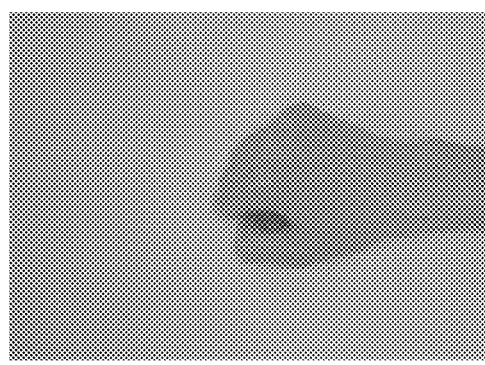 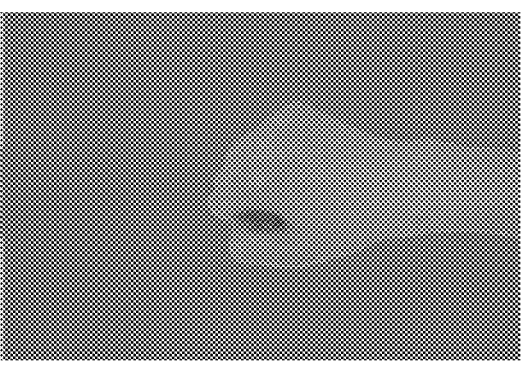
FIG. 7D1  FIG. 7D2
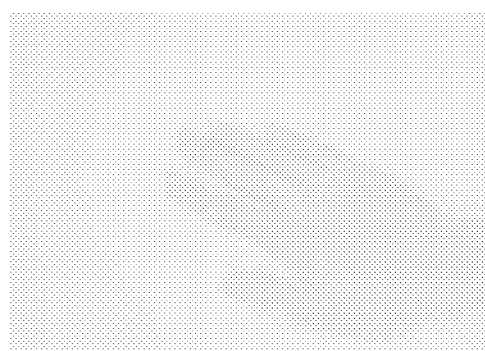 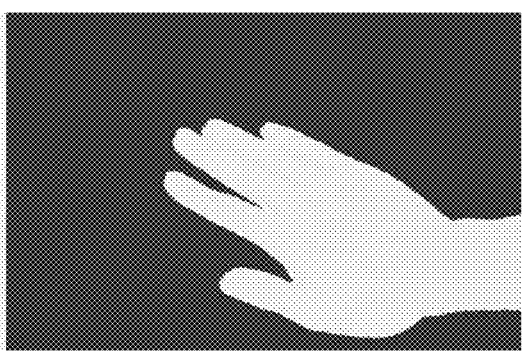

IMAGE PROCESSING METHOD, IMAGE PROCESSING SYSTEM AND DISPLAY DEVICE FOR MODIFYING BACKGROUND COLORS BASED ON OBJECT COLORS

TECHNICAL FIELD

The present invention relates to image processing methods and image processing systems.

BACKGROUND ART

A variety of display devices ranging from large display devices such as television receivers to small display devices such as cellular phones are put on the market. High-value-added products are needed and are being developed. In recent years, display devices that can display stereoscopic images have been developed in order to display more realistic images.

Physiological factors in recognition of objects as stereoscopic objects by humans are binocular parallax, convergence, focus slide, motion parallax, object size, spatial layout, contrast, shading, and the like.

Display devices employ methods utilizing binocular parallax as methods for displaying stereoscopic images in many cases. As a method utilizing binocular parallax, for example, there is a method of using special glasses for separating an image perceived by a left eye and an image perceived by a right eye. Further, as a method without using special glasses, there is a method of adding a mechanism (e.g., a parallax barrier, a lenticular lens, or a microlens array) for separating an image perceived by a left eye and an image perceived by a right eye to a display portion and displaying an image that can be perceived as a stereoscopic image by the naked eye (e.g., Patent Document 1).

[Reference]

Patent Document 1: Japanese Published Patent Application No. 2005-258013.

DISCLOSURE OF INVENTION

The above display method requires addition of a mechanism (e.g., a parallax barrier) to a display portion or special glasses, which leads to an increase in manufacturing cost or power consumption of a display device.

In view of the above, it is an object of one embodiment of the present invention to provide a simple image processing method for increasing a stereoscopic effect or a depth effect of a full-color two-dimensional image. Alternatively, it is an object of one embodiment of the present invention to provide an image processing system for increasing a stereoscopic effect or a depth effect of a full-color two-dimensional image, without a special mechanism.

Humans perceive an image as a planar image when a hue difference between an object and a background of the image is small. On the contrary, humans perceive an image as an image with a stereoscopic effect or a depth effect when a hue difference between an object and a background of the image is large.

Note that in this specification, a figure to be emphasized or to be clear in an image is referred to as an object, and a figure other than the object in the image is referred to as a background.

As a method for converting an image which hardly has a stereoscopic effect or a depth effect into an image which easily has a stereoscopic effect or a depth effect, a method for displaying a background in a color with a hue which is opposite to (sufficiently apart from) the hue of the average color of an object (an inversion color, an opposite color, or a complementary color) has been devised. Note that in this specification, the average color of an object (also referred to as the average color of an object region) is the average color of all the pixels included in an object region.

Note that in this specification, a plurality of pixels (a pixel group) constituting an object in an object image is referred to as an object region, and a plurality of pixels (a pixel group) constituting a background in the object image is referred to as a background region.

In other words, one embodiment of the present invention is an image processing method that includes the following steps: a first step of separating all the pixels constituting an object image into an object region and a background region; a second step of calculating the average color of the object region and calculating an inversion color from the average color; and a third step of providing the inversion color to all the pixels included in the background region at a constant rate.

One embodiment of the present invention is an image processing method that includes the following steps: a first step of separating all the pixels constituting an object image represented as (N+1) grayscales using an RGB color model into an object region and a background region; a second step of calculating an average color $(R_1, G_1, B_1)$ from all the colors of pixels included in the object region and calculating an inversion color $(R_2, G_2, B_2)$ represented as $(N-R_1, N-G_1, N-B_1)$ from the average color $(R_1, G_1, B_1)$; and a third step of providing the inversion color $(R_2, G_2, B_2)$ to a color $(R_{xy}, G_{xy}, B_{xy})$ of a pixel (x, y) included in the background region at a constant rate and calculating a color $(R'_{xy}, G'_{xy}, B'_{xy})$ of a pixel (x, y) included in a background region of a processed image. The third step is represented as Equation (1).

$$(R'_{xy}, G'_{xy}, B'_{xy}) = (kR_{xy} + (1-k)R_2, kG_{xy} + (1-k)G_2, kB_{xy} + (1-k)B_2)$$

where $0 < k < 1$ \hfill (1)

Note that in this specification, an image obtained by performing image processing according to one embodiment of the present invention on an object image is referred to as a processed image.

In the image processing method, k in Equation (1) is preferably 0.2 to 0.8 because the image processing becomes highly effective.

In the image processing method, after the third step, it is preferable to perform gamma correction, contrast enhancement, sharpening, or edge enhancement as a fourth step.

By the fourth step, the object in the processed image can be further sharpened or enhanced.

One embodiment of the present invention is an image processing system that includes a processing portion for producing a processed image by the image processing method. The image processing system may further include a display portion for displaying the processed image. The image processing system may further include a storage portion for storing the processed image.

It is possible to provide a simple image processing method for increasing a stereoscopic effect or a depth effect of a full-color two-dimensional image. Alternatively, it is possible to provide an image processing system for increasing a stereoscopic effect or a depth effect of a full-color two-dimensional image, without a special mechanism.

BRIEF DESCRIPTION OF DRAWINGS

In the accompanying drawings:

FIGS. 7A-1 to 7D-2 illustrate Example 1; and

BEST MODE FOR CARRYING OUT THE INVENTION

Figure 1:
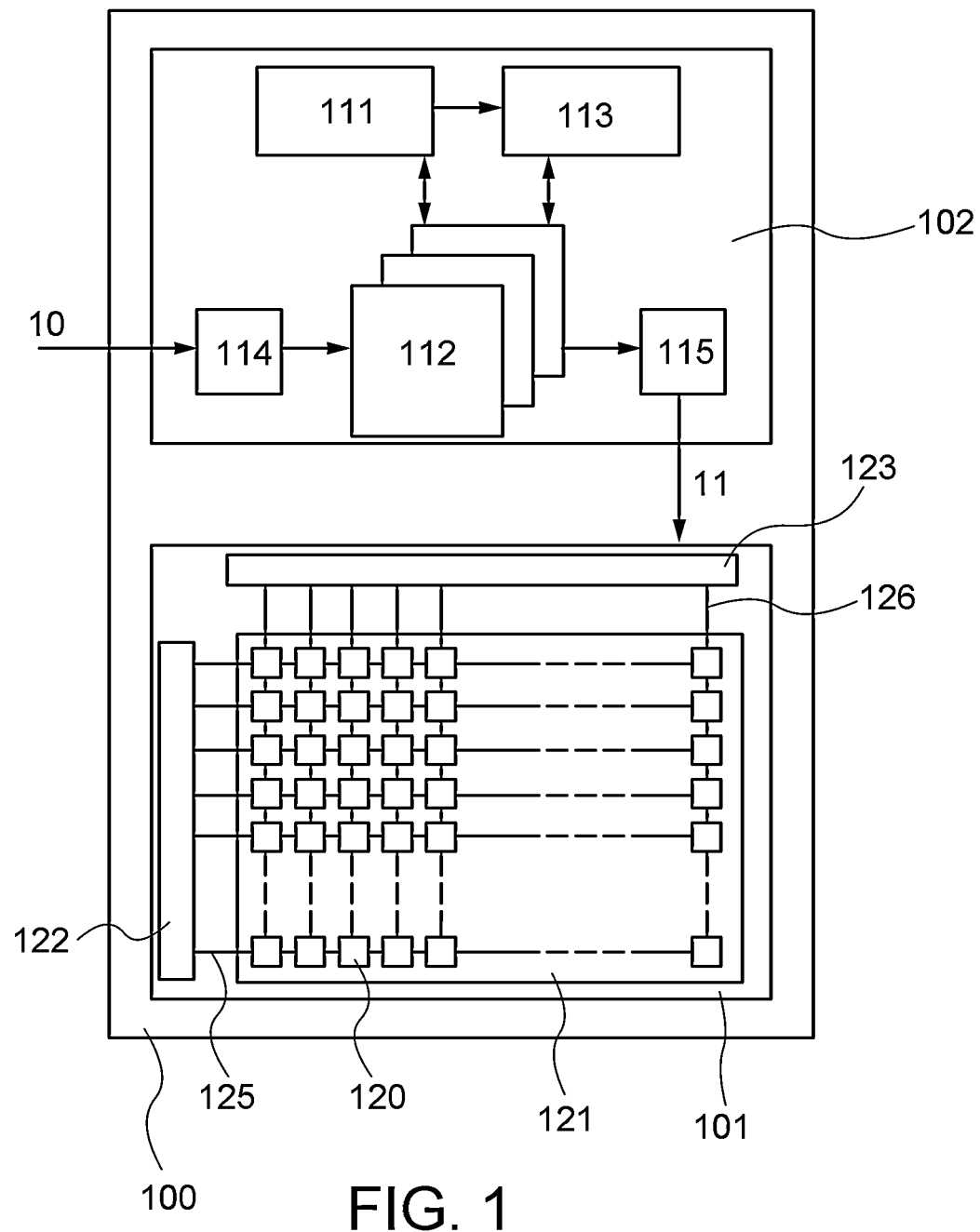
FIG. 1 illustrates an image processing system according to one embodiment of the present invention.

Embodiments and an example will be described in detail with reference to the drawings. Note that the present invention is not limited to the following description. It will be readily appreciated by those skilled in the art that modes and details of the present invention can be modified in various ways without departing from the spirit and scope of the present invention. The present invention therefore should not be construed as being limited to the following description of the embodiments and the example. Note that in structures of the present invention described below, the same portions or portions having similar functions are denoted by the same reference numerals in different drawings, and a description thereof is not repeated.

(Embodiment 1)

In this embodiment, an image processing method and an image processing system according to one embodiment of the present invention are described with reference to FIG. 1, FIGS. 2A and 2B, FIG. 3, FIGS. 4A to 4D, and FIG. 6A.

The image processing system according to one embodiment of the present invention includes a processing portion capable of producing a processed image by the image processing method according to one embodiment of the present invention. Examples of the image processing system according to one embodiment of the present invention include a display device that includes the processing portion and a display portion for displaying image data output from the processing portion and a storage device that includes the processing portion and a storage portion for storing image data output from the processing portion. In this embodiment, the image processing system according to one embodiment of the present invention is described giving a display device 100 illustrated in FIG. 1 as an example.

<Display Device 100>

The display device 100 illustrated in FIG. 1 includes a display portion 101 and a processing portion 102.

<Display Portion 101>

The display portion 101 has a function of displaying image data output from the processing portion 102. The display portion 101 displays a two-dimensional image. The display portion 101 displays a still image or a moving image constituted of a plurality of images.

For example, a liquid crystal display device, an electroluminescent display device, a plasma display, or the like can be used as the display portion 101. The display portion 101 includes a pixel portion 121 including a plurality of pixels 120, a scan line driver circuit 122, a signal line driver circuit 123, and the like.

The pixel portion 121 includes the pixels 120 arranged in matrix. Each of the pixels 120 is electrically connected to a scan line 125 and a signal line 126. Thus, each of the pixels 120 is electrically connected to the scan line driver circuit 122 and the signal line driver circuit 123.

The color of each of the pixels 120 depends on image data input from the processing portion 102. A signal for selecting the pixel 120 performing display is input from the scan line driver circuit 122 to the scan line 125, and image data is input from the signal line driver circuit 123 to the signal line 126. The selected pixel 120 performs display.

<Processing Portion 102>

The processing portion 102 has functions of extracting an object from a read object image and separating an object region constituted of a pixel group constituting the object and a background region constituted of another pixel group. The processing portion 102 also has functions of performing image processing on pixels included in the background region and producing a processed image.

The processing portion 102 includes an arithmetic processing portion 111, a data storage portion 112, a control portion 113, an input-side interface portion 114, an output-side interface portion 115, and the like.

The arithmetic processing portion 111 performs various kinds of arithmetic processing such as arithmetic processing of image data. For example, the arithmetic processing portion 111 includes a central processing unit (CPU), an arithmetic circuit for image processing, and the like.

The data storage portion 112 includes various kinds of storage circuits for storing data for performing image processing in the processing portion 102. For example, the data storage portion 112 includes a read only memory (ROM) which stores a computer program with which the arithmetic processing portion 111 performs arithmetic processing, data on a filter for image processing, a look-up table, and the like; a random access memory (RAM) which stores an arithmetic result calculated by the arithmetic processing portion 111; a memory circuit which stores image data input to the processing portion 102; and the like.

The control portion 113 includes a circuit for controlling circuits included in the processing portion 102. For example, the control portion 113 includes a writing control circuit which controls writing of data to the data storage portion 112, a reading control circuit which controls reading of the data, and the like.

The input-side interface portion 114 exchanges signals with an external device in order to take data 10 (e.g., image data) from an external device connected to the processing portion 102 and put the data 10 into the processing portion 102. The external device may be any device as long as it can output image data. For example, an image pickup device such as a camera, or an image reproducing device for reproducing image data stored in a storage medium such as a hard disk or a DVD can be used.

In order to process image data in the processing portion 102, the image data needs to be digital data. For example, in the case where analog image data is to be processed in the processing portion 102, the input-side interface portion 114 may be provided with an analog-digital converter (an A/D converter).

The output-side interface portion 115 exchanges signals with the display portion 101 in order to output image data 11 to the display portion 101.

For example, in order to output an analog image signal to the display portion 101, the output-side interface portion 115 may be provided with a digital-analog converter (a D/A converter).

<Image Processing Method>

The image processing method according to one embodiment of the present invention is described. FIGS. 2A and 2B, FIG. 3, and FIG. 6A are flow charts of an image processing method implemented in the processing portion 102 illustrated in FIG. 1.

Figure 2A:
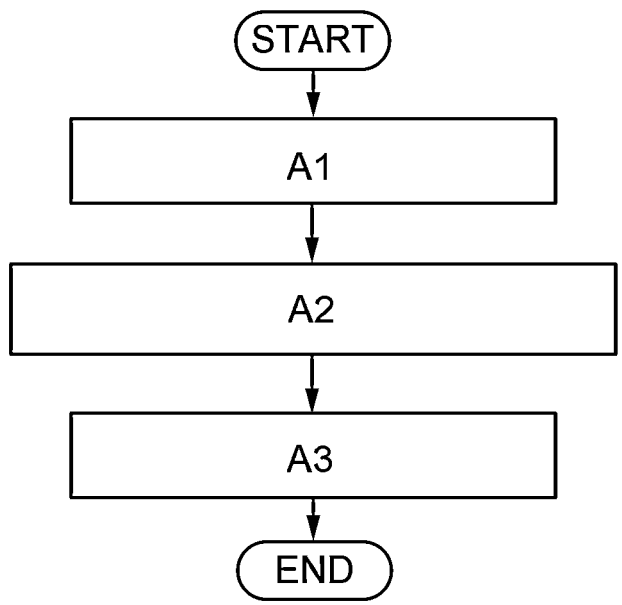
FIGS. 2A and 2B illustrate an image processing method according to one embodiment of the present invention.

The image processing method in this embodiment includes the following steps: a first step of separating all the pixels constituting an object image into an object region and a background region (Step A1 in FIG. 2A); a second step of calculating an average color of the object region and calculating an inversion color from the average color (Step A2 in FIG. 2A); and a third step of providing the inversion color to all the pixels included in the background region at a constant rate (Step A3 in FIG. 2A).

The hues of the object color and background color of a processed image subjected to image processing according to one embodiment of the present invention are apart from those of an object image; thus, a viewer can obtain a sense of perspective in an object and a background when the viewer sees the processed image. In other words, the processed image has a higher stereoscopic effect or depth effect than the object image.

<First Step A1: Separate Object Region and Background Region>

First, pixels of an object image are separated into an object region and a background region. A method for separating the pixels of the object image into an object region and a background region is not particularly limited.

In one embodiment of the present invention, a difference between an image (referred to as a comparison image) including part of a background and a full-color two-dimensional object image constituted of an object and the background is obtained, a region in which the difference is equal to or larger than a threshold value (or larger than the threshold value) is defined as an object region, and a region in which the difference is smaller than the threshold value (or equal to or smaller than the threshold value) is defined as a background region. The threshold value may be any value as long as an object region and a background region can be separated from each other. A person who performs image processing may use a value which the person determines is appropriate for separating an object region and a background region from each other as the threshold value.

Specifically, the object image may be either a still image such as a picture or an image selected from a plurality of frame images constituting a moving image.

As the comparison image, an image which is taken in the same or substantially the same focus condition as the object image but is different from the object image can be used. In the case where a plurality of comparison images are used, an object included in the object image may be included in the comparison image. Thus, in the case where the object image is one of a plurality of frame images constituting a moving image instead of a still image such as a picture, the comparison image may be a previous or following image of the one of the plurality of frame images.

Next, a method for calculating a difference between an object image and a comparison image is specifically described.

Figure 3:
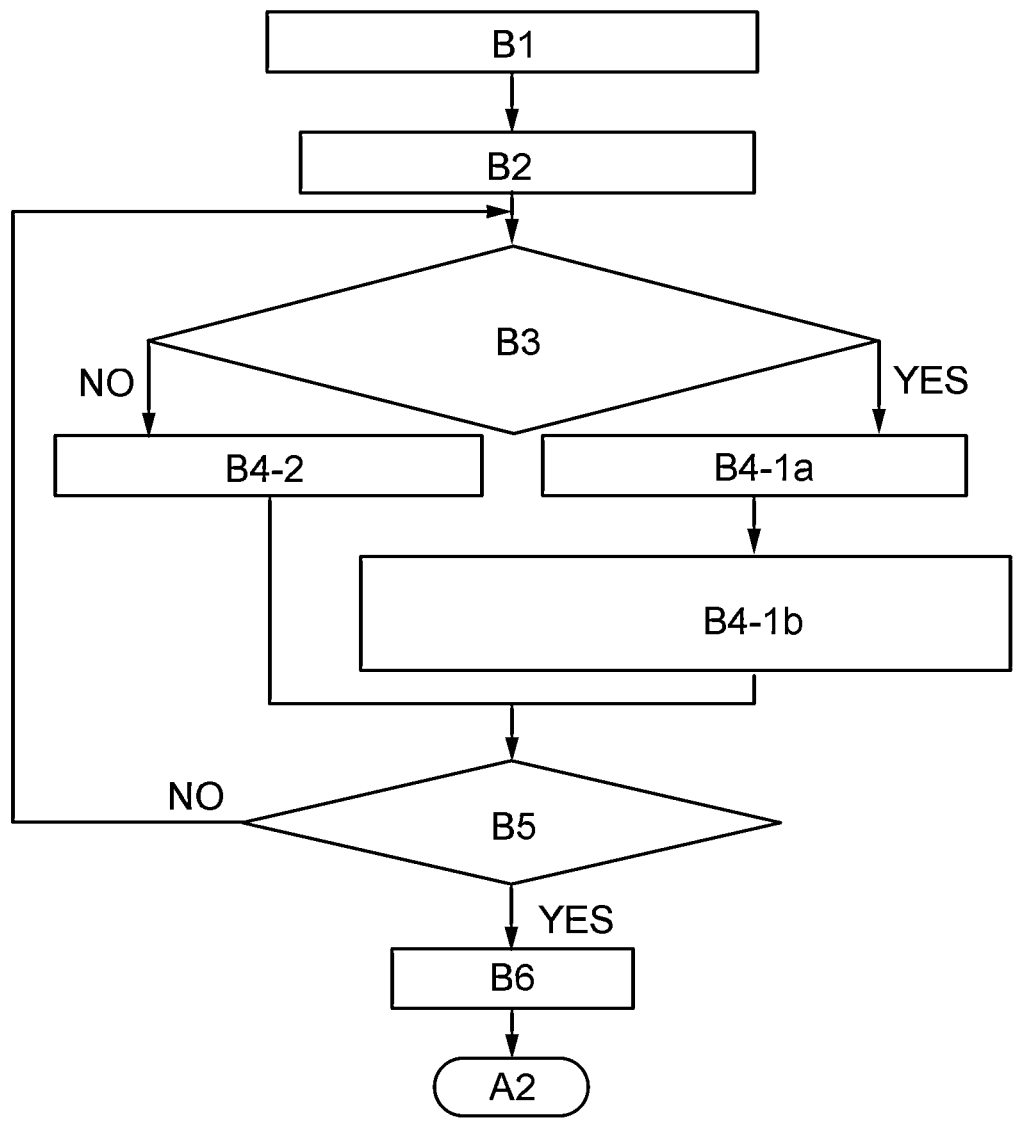
FIG. 3 illustrates an image processing method according to one embodiment of the present invention.

Details of the first step A1 in this embodiment (Steps B1 to B6) are described with reference to FIG. 3.

[Step B1: Read Object Image and Comparison Image]

In Step B1, an object image and a comparison image are read in the processing portion 102. Data on the read object image and comparison image is written to the data storage portion 112. Each of the object image and the comparison image can be input from an external device to the processing portion 102. Alternatively, an image which is stored in the data storage portion 112 in advance may be used as the comparison image.

In this embodiment, still images are used as the object image and the comparison image. The object image in this embodiment (FIG. 4A) is an image constituted of an object and a background, and the comparison image (FIG. 4B) is an image constituted of only the background (an image which includes only a background taken in the same focus condition as the object image, i.e., an image which does not include an object).

Note that an example in which the object image and the comparison image are selected from a plurality of frame images constituting a moving image will be described in detail in Embodiment 2.

[Step B2: Reset Sum and Processing Counter Value]

In a latter step, the sum of gray scale values of R, G, and B in all the pixels of an object region in an object image is calculated to be Sum (R), Sum (G), and Sum (B). Further, the total number of pixels in the object region is calculated to be a processing counter value counter. Here, in the case where each of Sum (R), Sum (G), Sum (B), and the processing counter value counter is not 0, it is set to 0. In the case where each of Sum (R), Sum (G), Sum (B), and the processing counter value counter is 0, this step can be omitted. Note that Step B2 may be performed before Step B1.

[Step B3: Pixel (x, y) is Pixel in Object Region?]

In Step B3, it is determined whether the absolute value of a difference in gray scale value between color components of a pixel (x, y) in the comparison image and a pixel (x, y) in the object image is equal to or larger than the threshold value. Details of Step B3 (Steps B3-1 to B3-3) are described with reference to FIG. 6A.

Data on the pixel (x, y) includes data for specifying one color. When the display portion 101 has a structure where three color elements of red (R), green (G), and blue (B) express one color, the data on the pixel (x, y), which is the minimum unit of image data, includes gray scale values of R, G, and B. Note that a color other than R, G, and B may be used for the color element. For example, yellow, cyan, or magenta may be used.

In this embodiment, the data on the pixel (x, y) includes gray scale values of three colors (color components) of R, G, and B.

Note that in order to extract an object region from an object image more accurately, a mask image may be produced after image processing is performed on the object image or/and a comparison image. Examples of such image processing include averaging processing, filter processing using a linear primary differential filter in the horizontal direction, edge detection processing, and noise removal processing using a median filter or the like.

[Step B3-1: Calculate ΔR(x, y), ΔG(x, y), and ΔB(x, y)]

In Step B3, first, three difference values ΔR(x, y), ΔG(x, y), and ΔB(x, y) are calculated. Here, the difference value ΔR(x, y) is the absolute value of a difference between the gray scale value of R of the pixel (x, y) in the comparison image and the gray scale value of R of the pixel (x, y) in the object image; the difference value ΔG(x, y) is the absolute value of a difference between the gray scale value of G of the pixel (x, y) in the comparison image and the gray scale value of G of the pixel (x, y) in the object image; and the difference value ΔB(x, y) is the absolute value of a difference between the gray scale value of B of the pixel (x, y) in the comparison image and the gray scale value of B of the pixel (x, y) in the object image.

[Step B3-2: Determine $\alpha_R(x, y)$, $\alpha_G(x, y)$, and $\alpha_B(x, y)$]

Next, whether the difference values ΔR(x, y), ΔG(x, y), and ΔB(x, y) are equal to or larger than the threshold values $R_{th}$, $G_{th}$, and $B_{th}$, respectively, is determined.

A gray scale determination value is set to 1 when the difference value is equal to or larger than the threshold value; and the gray scale determination value is set to 0 when the difference value is smaller than the threshold value. In other words, the red gray scale determination value $\alpha_R(x, y)$ is set to 1 when ΔR(x, y)≥$R_{th}$, and the red gray scale determination value $\alpha_R(x, y)$ is set to 0 when ΔR(x, y)<$R_{th}$. The same applies to green and blue gray scale determination values. The gray scale determination values $\alpha_g(x, y)$ and $\alpha_B(x, y)$ are set to 1 or 0 depending on whether the difference values ΔG(x, y) and ΔB(x, y) are equal to or larger than the threshold values $G_{th}$ and $B_{th}$ or smaller than the threshold values $G_{th}$ and $B_{th}$.

Here, whether the pixel (x, y) is a pixel in the object region is determined using the amount of changes in gray scale value between color components of two images (the object image and the comparison image). The threshold values $R_{th}$, $G_{th}$, and $B_{th}$ are threshold values of the amount of changes in gray scale value for determining whether the pixel (x, y) is included in the object region or the background region. The threshold values $R_{th}$, $G_{th}$, and $B_{th}$ can be independently determined.

[Step B3-3: Determine Difference Determination Value D(x, y)]

Next, whether the sum of gray scale determination values of R, G, and B is equal to or larger than 2 is determined. A difference determination value D(x, y) of the pixel (x, y) is set to 1 when $\alpha_R(x, y)+\alpha_G(x, y)+\alpha_B(x, y)$≥2, and the difference determination value D(x, y) is set to 0 when $\alpha_R(x, y)+\alpha_G(x, y)+\alpha_B(x, y)$<2.

Here, the difference determination value D(x, y) is determined depending on whether the sum of gray scale determination values of R, G, and B is equal to or larger than 2; however, the difference determination value D(x, y) may be determined depending on whether the sum of gray scale determination values of R, G, and B is equal to or larger than 1 or equal to 3.

[Step B4-1: Pixel (x, y) in Object Image Is Pixel in Object Region]

In the case where the difference determination value D(x, y) is 1 in Step B3, the pixel (x, y) in the object image is the pixel in the object region. Further, the pixel (x, y) in the mask image displays white (Step B4-1a).

Further, in the case where the difference determination value D(x, y) is 1 in Step B3, the gray scale values of R, G, and B of the pixel (x, y) in the object image are added to Sum (R), Sum (G), and Sum (B), and 1 is added to the processing counter value counter (Step B4-1b). By Step B4-1b, the inversion color of the object region can be calculated in Step B6.

[Step B4-2: Pixel (x, y) in Object Image is Pixel in Background Region]

In the case where the difference determination value D(x, y) is 0 in Step B3, the pixel (x, y) in the object image is the pixel in the background region. Further, the pixel (x, y) in the mask image displays black.

[Step B5: Determine Difference in Gray Scale Values of all Pixels?]

Steps B3 to B5 are repeatedly performed until the absolute value of a difference in gray scale value between color components of all the pixels in an object image and pixels in a comparison image are calculated and whether the absolute value of the difference is equal to or larger than the threshold value is determined.

[Step B6: Produce Mask Image]

Figure 4A:
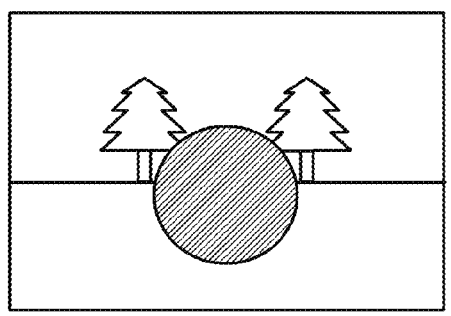
FIGS. 4A to 4D each illustrate an image used for an image processing method according to one embodiment of the present invention.
Figure 4B:
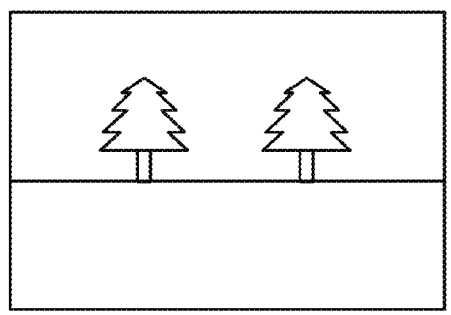
Figure 4C:
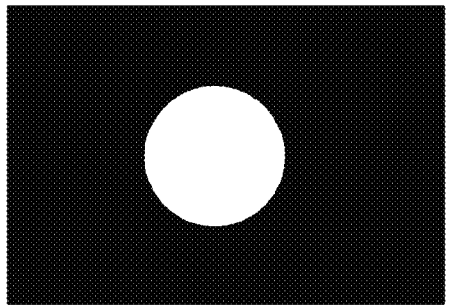

By determination of the colors of mask images (black or white) in all the pixels, a mask image illustrated in FIG. 4C is produced. The mask image illustrated in FIG. 4C is a binary image constituted of an object region (a white display region) and a background region (a black display region). By production of the mask image illustrated in FIG. 4C, an object image is separated into an object region and a background region. Note that Step A2 may be performed before Step B6.

The first step A1 is completed through Steps B1 to B6.

<Second Step A2: Calculate Average Color and Inversion Color of Object Region>

Next, the average color and inversion color of an object region are calculated.

In the second step A2, the average color of an object region is calculated by calculation of the average color of all the pixels that are separated into the object region in the first step A1, and the inversion color of the object region is calculated from the average color.

(Average Color)

By the processing performed in Step B4-1b, the sum of gray scale values of R, G, and B in all the pixels of the object region in the object image is calculated to be Sum (R), Sum (G), and Sum (B). Further, the total number of pixels in the object region is calculated to be a processing counter value counter. In Step A2, by division of Sum (R), Sum (G), and Sum (B) by the processing counter value counter, the average color of all the pixels included in the object region in the object image is calculated. Here, the average gray scale values of R, G, and B in (N+1) grayscales of the pixel in the object region are represented as $R_1$, $G_1$, and $B_1$, respectively, and the average color is represented as ($R_1$, $G_1$, $B_1$).

Note that the average color may be a median value of the gray scale values of R, G, and B in all the pixels included in the object region in the object image. A method for calculating the median value is described below.

First, in Step B4-1b, the gray scale values of R, G, and B in all the pixels of the object region are stored, and the total number of pixels included in the object region is calculated to be a processing counter value counter. Then, in Step A2, a value M that is half of the processing counter value counter is calculated. Further, the gray scale values of R, G, and B are arranged in ascending or descending order, and M-th gray scale values of R, G, and B are defined as $R_1$, $G_1$, and $B_1$, respectively. Note that when the processing counter value counter is an odd number, an (M+0.5)th or (M−0.5)th value can be the average color of the object region. Alternatively, the average value of the (M+0.5)th or (M−0.5)th value can be the average color of the object region.

(Inversion Color)

Further, the inversion color of the average color of the object region is calculated from the average color of the object region. The inversion color of the average color ($R_1$, $G_1$, $B_1$) can be represented as (N−$R_1$, N−$G_1$, N−$B_1$). This color is used as an inversion color ($R_2$, $G_2$, $B_2$).

Note that as to be described later in Example 1, when the average color ($R_1$, $G_1$, $B_1$) of an object that is an average color of all the pixels included in the object region in the object image represented as (N+1) grayscales and the inversion color ($R_2$, $G_2$, $B_2$) of the average color ($R_1$, $G_1$, $B_1$) of the object satisfy Equations (2) and (3), a processed image with a particularly high stereoscopic effect or depth effect can be obtained by an image processing method according to one embodiment of the present invention.

$$\Delta_{1-2} = |R_1 + G_1 + B_1 - (R_2 + G_2 + B_2)| \quad (2)$$

$$0 < \Delta_{1-2} \leq 2.4N \quad (3)$$

<Third Step A3: Provide Inversion Color to Background Region>

Next, the inversion color calculated in the second step A2 is provided to all the pixels included in the background region at a constant rate.

Specifically, the inversion color calculated in the second step A2 is provided to the pixel (x, y) that is a pixel in the background region at a constant rate with the use of the mask image obtained in the first step A1. Note that the inversion color is not provided to the pixel (x, y) that is a pixel in the object region.

Figure 2B:
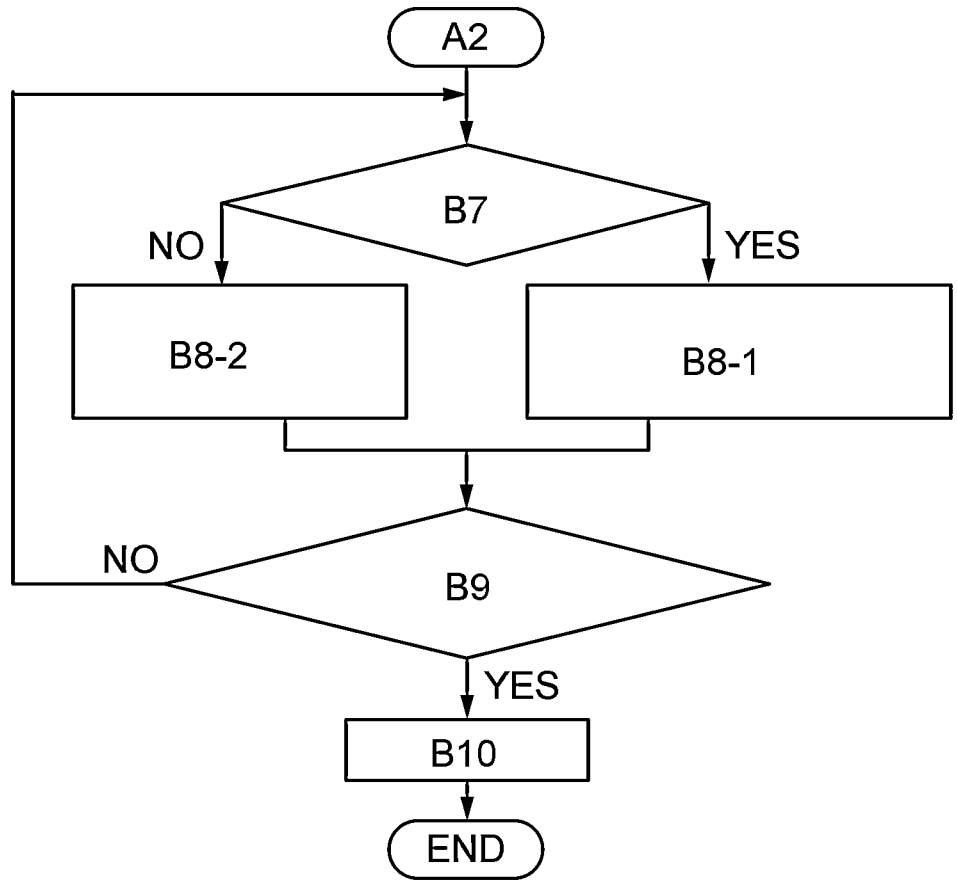

Details of the third step A3 (Steps B7 to B10) are described with reference to FIG. 2B.

[Step B7: Pixel (x, y) in Mask Image Displays Black?]

In Step B7, whether the pixel (x, y) in the mask image displays black or white is determined. Step B8-1 is performed in the case where the pixel (x, y) in the mask image displays black, and Step B8-2 is performed in the case where the pixel (x, y) in the mask image displays white.

[Step B8-1: Pixel (x, y) in Mask Image Displays Black]

In the case where the pixel (x, y) in the mask image displays black (in the case where the pixel (x, y) is a pixel in the background region), the color of a pixel (x, y) in the processed image depends on the color of a pixel (x, y) in the object image and the inversion color. Specifically, a color $(R'_{xy}, G'_{xy}, B'_{xy})$ of the pixel (x, y) in the background region in the processed image can be expressed as Equation (1) with the use of a color $(R_{xy}, G_{xy}, B_{xy})$ of the pixel (x, y) in the object image and the inversion color $(R_2, G_2, B_2)$.

$$(R'_{xy}, G'_{xy}, B'_{xy}) = (kR_{xy} + (1-k)R_2, kG_{xy} + (1-k)G_2, kB_{xy} + (1-k)B_2)$$

where $0 < k < 1$ \quad (1)

In particular, k in Equation (1) is preferably 0.2 to 0.8 because the image processing becomes highly effective.

[Step B8-2: Pixel (x, y) in Mask Image Displays White]

In the case where the pixel (x, y) in the mask image displays white (in the case where the pixel (x, y) is a pixel in the object region), the color of a pixel (x, y) in the processed image is the color of a pixel (x, y) in the object image.

[Step B9: Determine Colors of all Pixels?]

Steps B7 to B9 are repeatedly performed until the colors of all the pixels in the processed image are determined.

[Step B10: Output Processed Image]

Figure 4D:
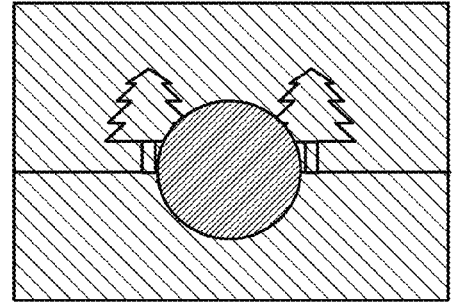

By determination of the colors of all the pixels in the processed image, a processed image illustrated in FIG. 4D is produced. As described above, a processed image can be obtained when image processing according to one embodiment of the present invention is performed on an object image.

Image processing may be further performed on the processed image obtained by the image processing method according to one embodiment of the present invention. Specifically, the image processing may be performed after Step B10 in FIG. 2B.

Examples of the image processing include sharpening such as unsharp masking, contrast conversion for enhancing contrast (contrast enhancement), gamma correction, and edge enhancement. These image processings can sharpen or enhance objects, for example.

For example, gamma correction is processing for correcting the grayscale of an image in response to a gamma value of a device for outputting an image (a value indicating response characteristics of the grayscale of an image). With gamma correction, a display portion can display an image which is close to data on a processed image output from a processing portion.

Contrast conversion is processing for changing color contrast. Color contrast can be changed by changing the slope of a gray scale value of a pixel subjected to processing in a graph with respect to a gray scale value of a pixel which is not subjected to processing. In order to enhance contrast, the slope in the graph may be larger than 1. For example, in the case where a gray scale value x of the pixel which is not subjected to processing is 0 to 50, the color contrast can be increased by Processing 1 with which a gray scale value y of the pixel subjected to the processing is 0 to 100 (y=2x, the slope in the graph=2) or Processing 2 with which the gray scale value y of the pixel subjected to the processing is 0 to 150 (y=3x, the slope in the graph=3). In particular, as the slope in the graph becomes larger, the color contrast becomes higher (Processing 2 makes the color contrast higher than Processing 1).

The hues of the object color and background color of the processed image obtained by the image processing method according to one embodiment of the present invention are apart from those of an object image; thus, a viewer can obtain a sense of perspective in an object and a background when the viewer sees the processed image. Consequently, in one embodiment of the present invention, a processed image that has a higher stereoscopic effect or depth effect than an object image can be obtained from the object image.

(Embodiment 2)

Figure 5:
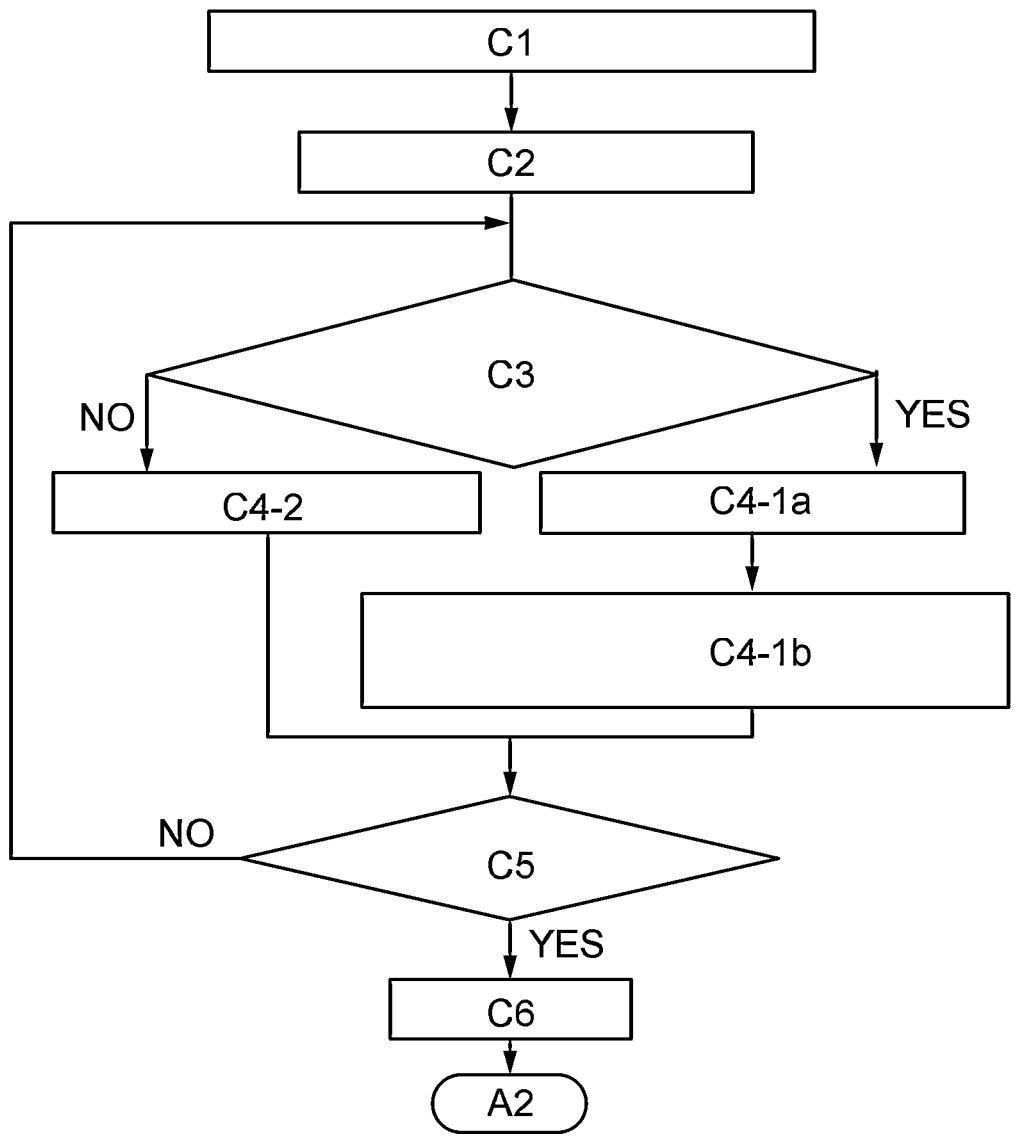
FIG. 5 illustrates an image processing method according to one embodiment of the present invention.
Figure 6A:
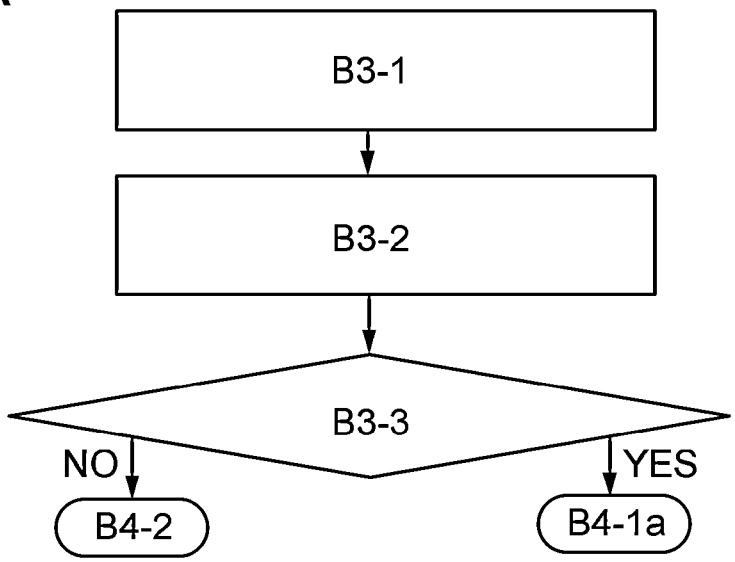
FIGS. 6A and 6B illustrate an image processing method according to one embodiment of the present invention.
Figure 6B:
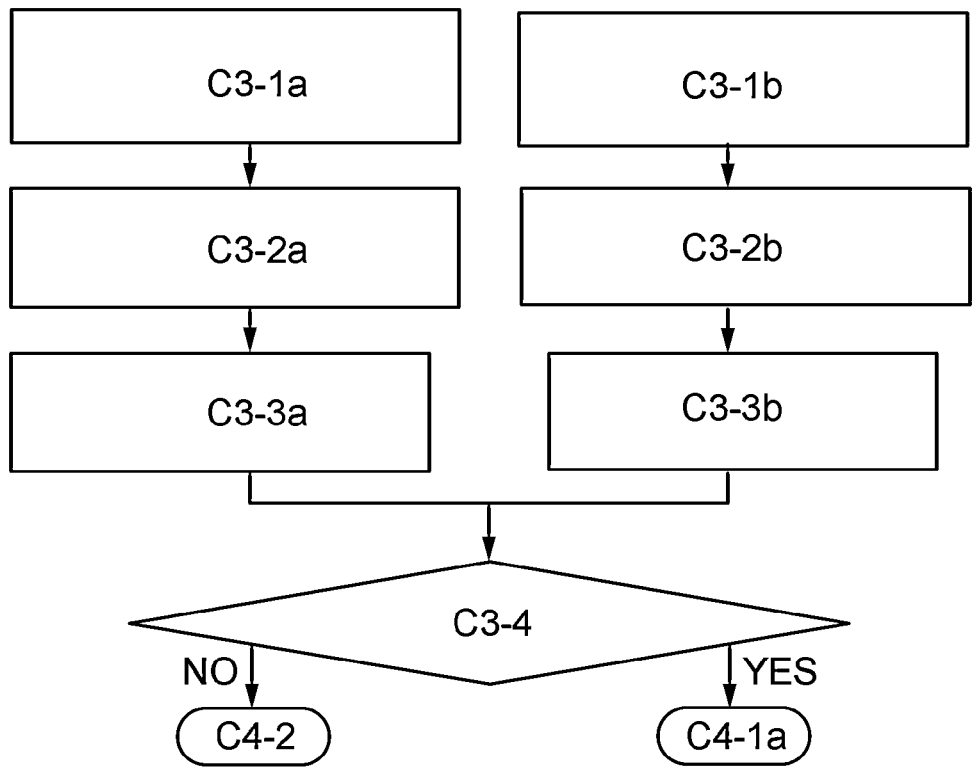

Unlike in Embodiment 1, in this embodiment, an image processing method that includes the following steps is described with reference to FIG. 5 and FIG. 6B: a first step of selecting an object image and a comparison image from a plurality of frame images constituting a moving image and separating all the pixels constituting the object image into an object region and a background region; a second step of calculating an average color in the object region and calculating an inversion color from the average color; and a third step of providing the inversion color to all the pixels included in the background region at a constant rate.

In a plurality of frame images constituting a moving image, there is a portion where an image is changed in two successive frame images. In this embodiment, in a frame image, a portion in which the amount of changes in motion is equal to or larger than a threshold value (or an image in which the amount of changes in motion is larger than the threshold value) is referred to as an object, and another portion is referred to as a background.

In the case where an object image is one of a plurality of frame images constituting a moving image, for example, a previous or following frame image of the object image can be used as a comparison image. Specifically, a previous or following frame image $f_{a-1}$ or $f_{a+1}$ of an object image $f_a$ can be a comparison image. The comparison image is not limited to the previous or following frame image of the object image. Thus, as the comparison image of the object image $f_a$, a frame image $f_{a-j}$ or a frame image $f_{a+j}$ (j is a natural number) may be used.

In this embodiment, steps which are made different from the steps in Embodiment 1 by selectively using a plurality of frame images constituting a moving image as an object image and a comparison image are described in detail. Specifically, the first step A1 in FIG. 2A is described.

Details of the first step A1 in this embodiment (Steps C1 to C6) are described with reference to FIG. 5. Note that Embodiment 1 can be referred to for the second step A2 and the third step A3.

[Step C1: Read Object Image and Comparison Image]

In Step C1, an object image and a comparison image are read in the processing portion 102. Data on the read object image and comparison image is written to the data storage portion 112. In this embodiment, three frame images $f_{a-1}$, $f_a$, and $f_{a+1}$ are read (the comparison images $f_{a-1}$ and $f_{a+1}$ and the object image $f_a$ are read).

[Step C2: Reset Sum and Processing Counter Value]

Here, in the case where each of Sum (R), Sum (G), Sum (B), and the processing counter value counter is not 0, it is set to 0. In the case where each of Sum (R), Sum (G), Sum (B), and the processing counter value counter is 0, this step can be omitted. Note that Step C2 may be performed before Step C1.

[Step C3: Pixel (x, y) is Pixel in Object Region?]

In Step C3, it is determined whether the absolute value of a difference in gray scale value between color components of a pixel (x, y) in the comparison image $f_{a-1}$ and a pixel (x, y) in the object image $f_a$ is equal to or larger than the threshold value. Further, it is determined whether the absolute value of a difference in gray scale value between R, G, and B of a pixel (x, y) in the comparison image $f_{a+1}$ and a pixel (x, y) in the object image $f_a$ is equal to or larger than the threshold value. Details of Step C3 are described with reference to FIG. 6B.

In this embodiment, data on the pixel (x, y) includes gray scale values of three colors of R, G, and B.

[Step C3-1a: Calculate $\Delta R_1(x, y)$, $\Delta G_1(x, y)$, and $\Delta B_1(x, y)$]

Three difference values $\Delta R_1(x,y)$, $\Delta G_1(x,y)$, and $\Delta B_1(x,y)$ are calculated from the comparison image $f_{a-1}$ and the object image $f_a$. Here, the difference value $\Delta R_1(x, y)$ is the absolute value of a difference between the gray scale value of R of the pixel (x, y) in the comparison image $f_{a-1}$ and the gray scale value of R of the pixel (x, y) in the object image $f_a$; the difference value $\Delta G_1(x,y)$ is the absolute value of a difference between the gray scale value of G of the pixel (x, y) in the comparison image $f_{a-1}$ and the gray scale value of G of the pixel (x, y) in the object image $f_a$; and the difference value $\Delta B_1(x, y)$ is the absolute value of a difference between the gray scale value of B of the pixel (x, y) in the comparison image $f_{a-1}$ and the gray scale value of B of the pixel (x, y) in the object image $f_a$.

[Step C3-2a: Determine $\alpha_{R1}(x, y)$, $\alpha_{G1}(x, y)$, and $\alpha_{B1}(x, y)$]

Next, whether the difference values $\Delta R_1(x, y)$, $\Delta G_1(x, y)$, and $\Delta B_1(x, y)$ are equal to or larger than the threshold values $R_{th}$, $G_{th}$, and $B_{th}$, respectively, is determined.

A gray scale determination value is set to 1 when the difference value is equal to or larger than the threshold value, and the gray scale determination value is set to 0 when the difference value is smaller than the threshold value. In other words, the red gray scale determination value $\alpha_{R1}(x, y)$ is set to 1 when $\Delta R_1(x, y) \geq R_{th}$, and the red gray scale determination value $\alpha_{R1}(x, y)$ is set to 0 when $\Delta R_1(x, y) < R_{th}$. The same applies to green and blue gray scale determination values. The gray scale determination values $\alpha_{G1}(x, y)$ and $\alpha_{B1}(x, y)$ are set to 1 or 0 depending on whether the difference values $\Delta G_1(x,y)$ and $\Delta B_1(x,y)$ are equal to or larger than the threshold values $G_{th}$ and $B_{th}$ or smaller than the threshold values $G_{th}$ and $B_{th}$.

[Step C3-3a: Determine Difference Determination Value $D_1(x, y)$]

Next, whether the sum of gray scale determination values of R, G, and B is equal to or larger than 2 is determined. A difference determination value $D_1(x, y)$ of the pixel (x, y) is set to 1 when $\alpha_{R1}(x, y)+\alpha_{G1}(x, y)+\alpha_{B1}(x, y) \geq 2$, and the difference determination value $D_1(x, y)$ is set to 0 when $\alpha_{R1}(x, y)+\alpha_{G1}(x, y)+\alpha_{B1}(x, y) < 2$.

Here, the difference determination value $D_1(x, y)$ is determined depending on whether the sum of gray scale determination values of R, G, and B is equal to or larger than 2; however, the difference determination value $D_1(x, y)$ may be determined depending on whether the sum of gray scale determination values of R, G, and B is equal to or larger than 1 or equal to 3.

[Step C3-1b: Calculate $\Delta R_2(x, y)$, $\Delta G_2(x, y)$, and $\Delta B_2(x, y)$]

Similarly, three difference values $\Delta R_2(x,y)$, $\Delta G_2(x, y)$, and $\Delta B_2(x, y)$ are calculated from the comparison image $f_{a+1}$ and the object image $f_a$. Here, the difference value $\Delta R_2(x, y)$ is the absolute value of a difference between the gray scale value of R of the pixel (x, y) in the comparison image $f_{a+1}$ and the gray scale value of R of the pixel (x, y) in the object image $f_a$; the difference value $\Delta G_2(x,y)$ is the absolute value of a difference between the gray scale value of G of the pixel (x, y) in the comparison image $f_{a+1}$ and the gray scale value of G of the pixel (x, y) in the object image $f_a$; and the difference value $\Delta B_2(x, y)$ is the absolute value of a difference between the gray scale value of B of the pixel (x, y) in the comparison image $f_{a+1}$ and the gray scale value of B of the pixel (x, y) in the object image $f_a$.

[Step C3-2b: Determine $\alpha_{R2}(x, y)$, $\alpha_{G2}(x, y)$, and $\alpha_{B2}(x, y)$]

Next, whether the difference values $\Delta R_2(x, y)$, $\Delta G_2(x, y)$, and $\Delta B_2(x, y)$ are equal to or larger than the threshold values $R_{th}$, $G_{th}$, and $B_{th}$, respectively, is determined. Then, the gray scale determination values $\alpha_{R2}(x, y)$, $\alpha_{G2}(x, y)$, and $\alpha_{B2}(x, y)$ are set to 1 or 0.

[Step C3-3b: Determine Difference Determination Value $D_2(x, y)$]

Next, whether the sum of gray scale determination values of R, G, and B is equal to or larger than 2 is determined. A difference determination value $D_2(x, y)$ of the pixel (x, y) is set to 1 when $\alpha_{R2}(x, y)+\alpha_{G2}(x, y)+\alpha_{B2}(x, y) \geq 2$, and the difference determination value $D_2(x, y)$ is set to 0 when $\alpha_{R2}(x, y)+\alpha_{G2}(x, y)+\alpha_{B2}(x, y) < 2$.

[Step C3-4: Determine Difference Determination Value $D_1(x, y)$]

Then, whether each of the difference determination values $D_1(x, y)$ and $D_2(x, y)$ is 1 is determined. In the case where each of the difference determination values $D_1(x, y)$ and $D_2(x, y)$ is 1, Step C4-1 (C4-1a) is performed. In the case where at lest one of the difference determination values $D_1(x, y)$ and $D_2(x, y)$ is not 1, Step C4-2 is performed.

[Step C4-1: Pixel (x, y) in Object Image is Pixel in Object Region]

In the case where each of the difference determination values $D_1(x, y)$ and $D_2(x, y)$ is 1 (the difference determination value $D_1(x, y)=1$ and $D_2(x, y)=1$) in Step C3-4, the pixel (x, y) in the mask image displays white (Step C4-1a). Note that it can be said that the pixel (x, y) in the object image is a pixel in the object region.

Further, in the case where each of the difference determination values $D_1(x, y)$ and $D_2(x, y)$ is 1 in Step C3-4, the gray scale values of R, G, and B of the pixel (x, y) in the object image are added to Sum (R), Sum (G), and Sum (B), and 1 is added to the processing counter value counter (Step C4-1b). By Step C4-1b, the average color and inversion color of the object region can be calculated in Step C6.

[Step C4-2: Pixel (x, y) in Object Image is Pixel in Background Region]

In the case where at least one of the difference determination values $D_1(x, y)$ and $D_2(x, y)$ is not 1 (the difference determination value $D_1(x, y)=0$ or/and $D_2(x, y)=0$) in Step C3-4, the pixel (x, y) in the mask image displays black. Note that it can be said that the pixel (x, y) in the object image is a pixel in the background region.

[Step C5: Determine Difference in Gray Scale Values of all Pixels?]

Steps C3 to C5 are repeatedly performed until the absolute value of a difference in gray scale values between color components of all the pixels in an object image and pixels in a comparison image are calculated and whether the absolute value of the difference is equal to or larger than the threshold value is determined.

[Step C6: Produce Mask Image]

By determination of the colors of mask images (black or white) in all the pixels, a mask image is produced. The mask image is a binary image constituted of an object region (a white display region) and a background region (a black display region). By production of the mask image, an object image is separated into an object region and a background region. Note that the second step A2 may be performed before Step C6.

The first step A1 in this embodiment is completed through Steps C1 to C6.

Then, processings performed after the first step A1 in Embodiment 1 may be performed.

As described in this embodiment, by an image processing method according to one embodiment of the present invention, an object image and a comparison image can be selected from a plurality of frame images constituting a moving image.

EXAMPLE 1

In this example, a processed image produced by an image processing method according to one embodiment of the present invention is described with reference to FIGS. 7A-1 to 7D-2 and FIGS. 8A to 8C.

Table 1 shows an average color ($R_1$, $G_1$, $B_1$), an inversion color ($R_2$, $G_2$, $B_2$), and $\Delta_{1\text{-}2}$ in an object region of an image that is not subjected to image processing according to one embodiment of the present invention in each of Structure Examples 1 to 4.

In this example, the average color is an average value of gray scale values of R, G, and B in 256 grayscales of all the pixels included in the object region.

TABLE 1

| | Average Color in Object Region (R1, G1, B1) | Inversion Color (R2, G2, B2) | $\Delta_{1\text{-}2}$ |
|---|---|---|---|
| Structure Example 1 | (231, 226, 221) | (24, 29, 34) | 591 |
| Structure Example 2 | (184, 169, 155) | (71, 86, 100) | 251 |
| Structure Example 3 | (149, 140, 139) | (106, 115, 116) | 91 |
| Structure Example 4 | (238, 236, 235) | (17, 19, 20) | 653 |

Note that $\Delta_{1\text{-}2}$ satisfies Equation (2).

$$\Delta_{1\text{-}2} = |R_1 + G_1 + B_1 - (R_2 + G_2 + B_2)| \quad (2)$$

Structure Example 1

FIG. 7A-1 shows an image (an object image) that is not subjected to image processing according to one embodiment of the present invention. FIG. 7A-2 shows an image (a processed image) that is subjected to image processing according to one embodiment of the present invention.

Figure 8A:
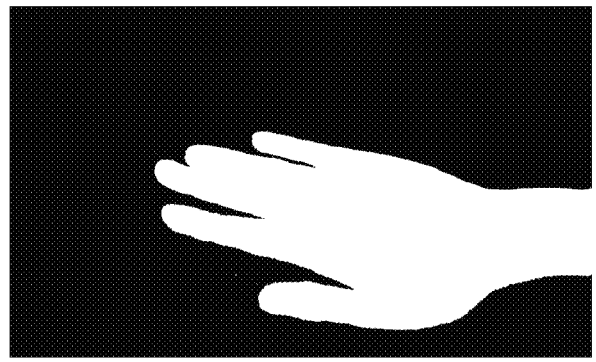
FIGS. 8A to 8C illustrate Example 1.

A mask image shown in FIG. 8A is a binary image in which an object region in the object image in Structure Example 1 is indicated in white and a background region is indicated in black.

Structure Example 2

FIG. 7B-1 shows an image (an object image) that is not subjected to image processing according to one embodiment of the present invention. FIG. 7B-2 shows an image (a processed image) that is subjected to image processing according to one embodiment of the present invention.

The mask image shown in FIG. 8A is a binary image in which an object region in the object image in Structure Example 2 is indicated in white and a background region is indicated in black.

Structure Example 3

FIG. 7C-1 shows an image (an object image) that is not subjected to image processing according to one embodiment of the present invention. FIG. 7C-2 shows an image (a processed image) that is subjected to image processing according to one embodiment of the present invention.

Figure 8B:
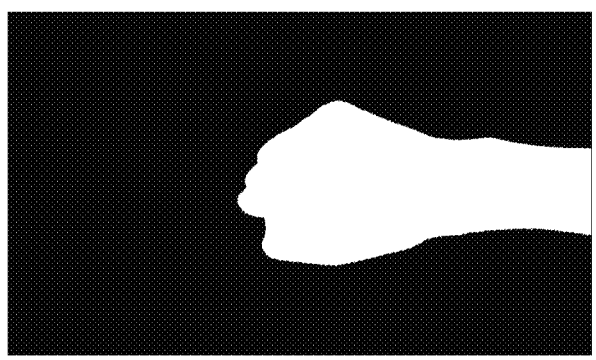

A mask image shown in FIG. 8B is a binary image in which an object region in the object image in Structure Example 3 is indicated in white and a background region is indicated in black.

Structure Example 4

FIG. 7D-1 shows an image (an object image) that is not subjected to image processing according to one embodiment of the present invention. FIG. 7D-2 shows an image (a processed image) that is subjected to image processing according to one embodiment of the present invention.

Figure 8C:
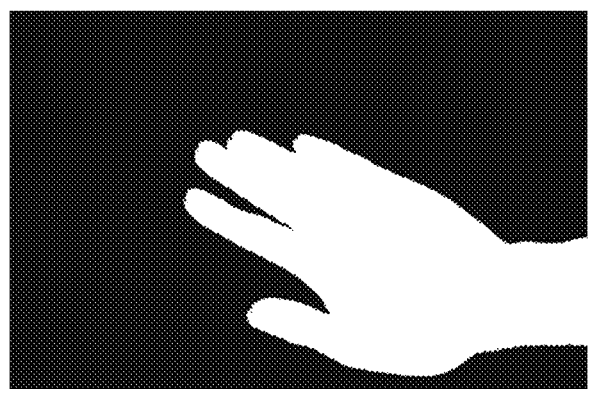

A mask image shown in FIG. 8C is a binary image in which an object region in the object image in Structure Example 4 is indicated in white and a background region is indicated in black.

A color ($R'_{xy}$, $G'_{xy}$, $B'_{xy}$) of the pixel (x, y) in the background region in the processed image in each of Structure Examples 1 to 4 can be expressed as Equation (4) with the use of the color ($R_{xy}$, $G_{xy}$, $B_{xy}$) of the pixel (x, y) in the object image and the inversion color ($R_2$, $G_2$, $B_2$). In this example, as shown in Equation (4), k in Equation (1) was 0.5. As the ratio of the color of a pixel in the background region in the object image to the inversion color becomes closer to 1:1, data on the background of the object image is not lost, and a processed image having high effectiveness of image processing can be obtained.

$$(R'_{xy}, G'_{xy}, B'_{xy}) = (0.5R_{xy} + 0.5R_2, 0.5G_{xy} + 0.5G_2, 0.5B_{xy} + 0.5B_2) \quad (4)$$

This example shows that it is possible to obtain a processed image which has a higher stereoscopic effect or depth effect than an object image by performing image processing according to one embodiment of the present invention on the object image.

In particular, in Structure Examples 1 to 3, an image processing method according to one embodiment of the present invention has high effectiveness. Structure Examples 1 to 3 satisfy Equation (3). Thus, an object image which is represented as (N+1) grayscales and has high effectiveness of an image processing method according to one embodiment of the present invention satisfies Equation (3). For example, in the case of an object image which is expressed in 256 grayscales, when $\Delta_{1-2}$ is larger than 0 and equal to or smaller than 612, the object image has high effectiveness of an image processing method according to one embodiment of the present invention.

$$0<\Delta_{1-2}\leq 2.4N \quad (3)$$

This application is based on Japanese Patent Application serial No. 2011-147047 filed with Japan Patent Office on Jul. 1, 2011, the entire contents of which are hereby incorporated by reference.

The invention claimed is:

1. An image processing method comprising:
   separating an object image into an object region and a background region;
   calculating a gray scale value of an average color of the object region;
   calculating a gray scale value of an inversion color of the object region by using the gray scale value of the average color; and
   calculating a gray scale value of a background region of a processed image by using the gray scale value of the inversion color and a gray scale value of the background region of the object image.

2. The image processing method according to claim 1, wherein each of the object image and the processed image is a full-color image.

3. The image processing method according to claim 1, wherein a gray scale value of an object region of the processed image is the same as the gray scale value of the object region of the object image.

4. The image processing method according to claim 1, wherein a plurality of pixels is separated into first pixels included in the object region and second pixels included in the background region.

5. The image processing method according to claim 1, further comprising a step of performing image processing on the processed image,
   wherein the step of performing image processing comprises gamma correction, contrast enhancement, sharpening or edge enhancement.

6. An image processing method comprising:
   separating an object image into an object region and a background region, wherein the object image expresses (N+1) gray scale values;
   calculating a gray scale value of an average color of the object region, wherein $(R_1, G_1, B_1)$ represents the gray scale value of the average color;
   calculating a gray scale value of an inversion color of the object region by an equation of $(R_2, G_2, B_2)=(N-R_1, N-G_1, N-B_1)$, wherein $(R_2, G_2, B_2)$ represents the gray scale value of the inversion color; and
   calculating a gray scale value of a background region of a processed image by an equation of $(R'_{xy}, G'_{xy}, B'_{xy})=(kR_{xy}+(1-k)R_2, kG_{xy}+(1-k)G_2, kB_{xy}+(1-k)B_2)$, wherein $(R'_{xy}, G'_{xy}, B'_{xy})$ represents a gray scale value of a pixel (x, y) of the background region of the processed image, $(R_{xy}, G_{xy}, B_{xy})$ represents a gray scale value of a pixel (x, y) of the background region of the object image, and wherein $0<k<1$.

7. The image processing method according to claim 6, wherein $|R_1+G_1+B_1-(R_2+G_2+B_2)|$ is greater than 0 and less than or equal to 2.4N.

8. The image processing method according to claim 6, wherein k is greater than or equal to 0.2 and less than or equal to 0.8.

9. The image processing method according to claim 6, wherein a gray scale value of a pixel (x, y) of an object region of the processed image is the same as the gray scale value of a pixel (x, y) of the object region of the object image.

10. The image processing method according to claim 6, wherein a plurality of pixels is separated into first pixels included in the object region and second pixels included in the background region.

11. The image processing method according to claim 6, further comprising a step of performing image processing on the processed image,
    wherein the step of performing image processing comprises gamma correction, contrast enhancement, sharpening or edge enhancement.

12. A display device comprising a processing portion and a display portion, the processing portion comprising:
    a means for separating an object image into an object region and a background region, wherein the object image expresses (N+1) gray scale values;
    a means for calculating a gray scale value of an average color of the object region, wherein $(R_1, G_1, B_1)$ represents the gray scale value of the average color;
    a means for calculating a gray scale value of an inversion color of the object region by an equation of $(R_2, G_2, B_2)=(N-R_1, N-G_1, N-B_1)$, wherein $(R_2, G_2, B_2)$ represents the gray scale value of the inversion color; and
    a means for calculating a gray scale value of a background region of a processed image by an equation of $(R'_{xy}, G'_{xy}, B'_{xy})=(kR_{xy}+(1-k)R_2, kG_{xy}+(1-k)G_2, kB_{xy}+(1-k)B_2)$, wherein $(R'_{xy}, G'_{xy}, B'_{xy})$ represents a gray scale value of a pixel (x, y) of the background region of the processed image, $(R_{xy}, G_{xy}, B_{xy})$ represents a gray scale value of a pixel (x, y) of the background region of the object image, and wherein $0<k<1$,
    wherein the display portion comprises a plurality of pixels for displaying the processed image.

13. The display device according to claim 12, wherein $|R_1+G_1+B_1-(R_2+G_2+B_2)|$ is greater than 0 and less than or equal to 2.4N.

14. The display device according to claim 12, wherein k is greater than or equal to 0.2 and less than or equal to 0.8.

15. The display device according to claim 12, wherein a gray scale value of a pixel (x, y) of an object region of the processed image is the same as the gray scale value of a pixel (x, y) of the object region of the object image.

16. The display device according to claim 12, wherein a plurality of pixels is separated into first pixels included in the object region and second pixels included in the background region.

17. The display device according to claim 12, wherein the processing portion further comprises a means for performing image processing on the processed image,
    wherein the means for performing image processing comprises gamma correction, contrast enhancement, sharpening or edge enhancement.

* * * * *